UNITED STATES PATENT OFFICE 2,483,778

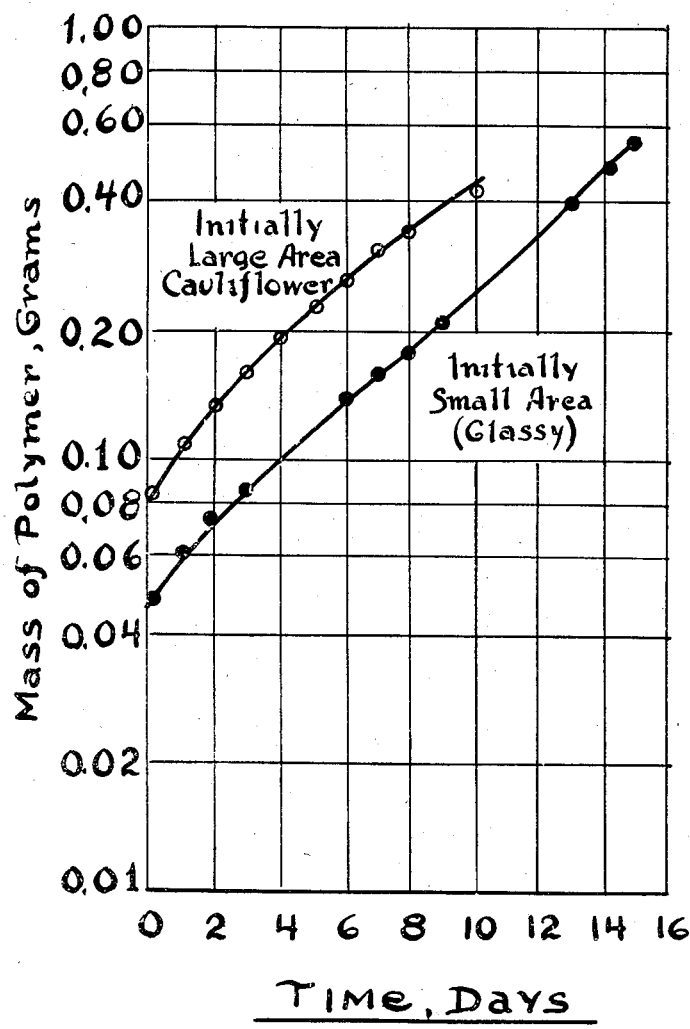

INHIBITION OF RESIN GROWTH FROM DIOLEFINS

Charles E. Morrell, Westfield, and Richard F. Robey, Cranford, N. J., assignors to Standard Oil Development Company, a corporation of Delaware Application August 14, 1946, Serial No. 690,560

6 Claims. (Cl. 260—666.5)

This invention relates to a process for minimizing or inhibiting the formation and/or growth of solid and semi-solid resins during the separation and segregation of diolefins from other hydrocarbons. It is generally applicable to operations in which diolefinic hydrocarbons are handled.

In the separation and segregation of diolefins from other hydrocarbons by absorption, desorption and distillation, various types of polymers are formed, that is, dimers, viscous high-molecular-weight polymers and semi-solid or resinous solid polymers. The dimers and viscous, high-molecular-weight polymers are generally soluble in the diolefin itself or other hydrocarbons and, in certain cases, are depolymerized on heating to the original diolefin. On the other hand, the solid polymers of the type which have been referred to as "cauliflower" or "popcorn" polymer because of the resemblance, are quite insoluble in the diolefin and other hydrocarbons, are generally infusible and, when in contact with a monomer, continue to grow. As a result of such growth, distillation columns and other plant equipment where the monomer is present becomes fouled. The insidious character of this polymer lies in the fact that it is insoluble in all solvents and cannot be completely eliminated from equipment by mechanical means so that in a short time fouling and plugging troubles recur. Even though the complete equipment is thoroughly cleaned, it is only a matter of time before residual particles of polymer will grow sufficiently to foul and plug the equipment. Two remedies were suggested, one to inhibit the initial growth of the self-propagating polymer and second, to control or stop the growth of preformed particles. Generally, the initial growth is found in most equipment and since this is so, means for controlling or stopping the growth of the preformed polymer is very desirable.

An object of this invention is to inhibit or stop the growth of a preformed self-propagating polymer. Various factors are considered to effect the growth of this resinous solid polymer. The presence of active oxygen (peroxides) in a diolefin, such as liquid butadiene, is believed to initiate the growth of a resinous solid popcorn polymer. Small amounts of air present in the system are a potential source of active oxygen. Other factors aiding the initiation of resinous solid polymer are the presence of active oxygen with unpolished iron, rusty iron, certain other metals and an interface of liquid water. Rusty iron with water even in the absence of air and added peroxides was very effective in initiating popcorn polymer formation. It is very difficult, if not almost impossible, to eliminate these factors which tend to initiate popcorn polymer formation in commercial equipment, hence the importance of inhibiting or stopping the growth of the preformed polymer.

The resinous solid polymers of the popcorn variety comprise small glassy lumps surrounded by finer granular clinging masses possessing some rubbery properties. This glassy material, despite its appearance, exhibits considerable rubber-like rebound when dropped on a hard surface. It is infusible and cannot be molded even at 150° C. It is insoluble in ordinary solvents such as benzene, carbon tetrachloride, and methyl ethyl ketone. It exhibits a slight solubility in hot xylene and a solution in xylene shows the presence of peroxides. Elemental analysis was 88.77% carbon and 11.27% hydrogen, corresponding closely to the formula $(C_4H_6)_x$.

On standing, the polymer undergoes degradation and yellowing, apparently as the result of contact with air. After exposing a sample for two months in air, elemental analysis became 84.79% carbon, 10.72% hydrogen, total 95.5%; the difference probably represents oxygen absorbed (peroxides, etc.). Absorption of oxygen tends to reduce the rate of self-propagation of the polymer.

Popcorn polymer of butadiene does not grow at a constant rate in contact with monomer, but rather propagates at a constantly accelerating rate, indicating that additional points of growth are continuously formed as the mass increases. A fresh supply of active oxygen, which generally materially aids the initiation of popcorn polymer, is not required for its subsequent growth.

The rate of growth of two resinous polymer seeds in butadiene vapor at 60° C. is shown in the figure. Although the initial seeds were radically different in physical form, the growth followed much the same pattern. Practically linear curves of identical slopes were obtained when the logarithm of the mass was plotted against time.

Considering that the logarithm of the mass in growth varies linearly with time, then $$\ln w = kt + c$$

which corresponds to the following differential growth equation:

$$\frac{dw}{dt} = kw$$

where $w$=mass, $t$=time, and $k$ and $c$ are constants. The fact that the rate is first order with respect to the mass is interpreted to mean that all portions of the polymer are in active growth and are accessible to the monomer probably as the result of permeation of the polymer by diolefin vapor or liquid. Visual observation shows that if a solid seed is exposed to diolefin vapor, it first swells, then cracks, and finally subdivides into fine granules. The granular mass continues to grow as long as monomeric vapor is supplied. If the polymer is confined in a space insufficient to accommodate the growing polymer, high pressures are built up in the vessel. A few tests of the polymer growth in the liquid phase gave approximately the same rate of growth as in the vapor phase.

It has been customary to inhibit polymerization of diolefins by adding small amounts of antioxidant inhibitors to the monomer. It has been found that this technique is virtually ineffective in inhibiting the growth of preformed popcorn polymers even when large amounts of inhibitor are employed. This invention comprises removing the monomer from the equipment or apparatus and treating all surfaces likely to harbor particles of the polymer with a selected treating agent which may comprise a gas, vapor, liquid or solution. Treatment may be carried out at ordinary or elevated temperatures and for sufficient time to result in reduction of the growth properties of the polymer to the desired extent or to inhibit growth until it is necessary to treat the equipment again. Our invention also comprises the use of selected treating agents. We have found that the most effective agents comprise those which attack, combine or associate chemically with aliphatic unsaturated hydrocarbons, including vulcanizing agents and accelerators for hydrocarbon rubbers, and/or those which primarily destroy peroxides, as presented in the attached table. Certain of the agents undoubtedly have both functions. Moreover, the effectiveness of an agent as an inhibitor for the growth of popcorn polymer may be related to the degree to which the agent in question pursues either or both of these chemical behaviors. It has become apparent to the inventors that the presence of active double bonds and/or active oxygen (peroxides) is necessary for the autocatalytic growth of the polymer; and moreover, that destruction or partial destruction of these components of the polymer is tantamount to the inhibition of polymer propagation. The invention should not be bound by any theory of the action of these agents, however. Neither should the classification of effective agents as outlined in the attached table be limited by any theory as to the mode of action of the agent toward the polymer or toward reactive chemical molecular groups within the polymer molecule. Action of some agents is undoubtedly by addition to the carbon-carbon double bond, others by virtue of action on the alpha carbon atom which is activated by the presence of the adjacent double bond. By vulcanizing agents and accelerators as a class it is implied substances which are capable of vulcanizing unsaturated hydrocarbon polymers or are capable of catalyzing the vulcanization action employing sulfur as the agent. It is postulated that such action takes place by cross-linking of double bonds between unsaturated polymer chains or by cross-linking between groups activated by the presence of double bonds. Certain action may take place by virtue of the presence of peroxides in the polymer. Peroxides are known to oxidize oximes to nitroso-bodies which in turn can combine with unsaturated linkages. Oximes are particularly effective treating agents. The nitroso-bodies are likewise effective. The mode of operation of the oximes may not only be destruction of peroxides, but the further action of the products of the reaction (nitroso-compounds) with the polymer.

Vulcanization accelerators such as tetramethylthiuram disulfide, N-cyclohexyl-2-benzothiazole sulfinamide, mercapto-benzothiazole in solution form were successfully used to treat the popcorn polymers during the "down" period, i. e., when the monomers were separated from the polymer. The polymer seeds should be treated when they are very small because when they are relatively large it is likely that the percentage of mass effectively treated is rather small. Smaller seeds are more effectively treated. Among the vulcanizing agents, sulfur was only moderately effective, nitroso bodies more so, and quinone dioxime very effective in inhibiting polymer growth.

Of the other agents reactive toward double bonds or materials containing double bonds, cuprous ammonia acetate solution is fairly effective. Bromine and sulfur dioxide vapors have a strongly inhibitive effect.

Of the substituted phenol-type oxidation inhibitors, none is exceptionally effective except in the presence of anhydrous aluminum chloride which is an active catalyst for alkylation of double bonds and hydrocarbon groups activated by the presence of double bonds. A sufficiently high concentration of $AlCl_3$ with either tert.-butyl catechol or resorcinol is very effective. $AlCl_3$ alone is only moderately effective.

As might be expected, concentrated sulfuric acid charred the seeds so that they did not grow markedly. More dilute acid did not reduce the rate as much as the concentrated acid did.

The popcorn polymer is treated with the deactivating agent during the down period, that is, while the monomer is removed from the equipment and is separated from the popcorn polymer. It is generally desirable to remove excess of the deactivating agent from the equipment after this treatment, as by washing with a suitable solvent, such as water for the water-soluble agents, sulfuric acid, etc., and liquid hydrocarbons for the oil-soluble vulcanizing agents and the like.

The following table illustrates the effectiveness of various agents by showing the growth of the popcorn polymers with and without treatment.

GROWTH OF BUTADIENE POPCORN POLYMER IN SATURATED BUTADIENE VAPOR AT 60° C. AFTER VARIOUS TREATMENT

Treating Agent[1]

| | Solvent, if any | Temp. of Treatment | Wt. of Seed, Grams | | | Duration, days | Growth, wt. per cent per mo.[4] | | Per Cent Residual Activity A/B×100 |
|---|---|---|---|---|---|---|---|---|---|
| | | | Initial | Final | Gain | | Treated Seed (A) | Untreated[3] Seed (B) | |
| CLASS A—VULCANIZING AGENTS AND ACCELERATORS | | | | | | | | | |
| Sulfur | Varsol | hot | 0.0402 | 0.0933 | 0.0531 | 8 | 2,270 | 17,750 | 13 |
| Tetramethyl-thiuram disulfide | benzene | do | 0.0294 | 0.0300 | 0.0006 | 8 | 12 | 17,750 | 0.07 |
| N-cyclohexyl-2-benzothiazole sulfinamide | do | do | 0.0461 | 0.0507 | 0.0046 | 8 | 41 | 17,750 | 0.23 |
| Mercapto-benzothiazole | do | do | 0.0505 | 0.0626 | 0.0121 | 8 | 126 | 17,750 | 0.71 |
| 30% dinitroso-benzene in clay, 2% in | do | do | 0.0142 | 0.0203 | 0.0061 | 8 | 296 | 2,950 | 10 |
| Dinitroso benzene vapors with steam | | 100° C | 0.0106 | 0.0140 | 0.0034 | 8 | 170 | 2,950 | 5.8 |
| Quinone dioxime | isopropyl alcohol | 80° C | 0.534 | 0.0582 | 0.0048 | 8 | 38 | 17,750 | 0.21 |
| Do | cuprous ammonia | room | 0.0092 | 0.0103 | 0.0011 | 8 | 65 | 2,950 | 2.1 |
| Do | do | hot | 0.0149 | 0.0176 | 0.0027 | 8 | 94 | 2,950 | 3.2 |
| CLASS B—OTHER SUBSTANCES WHICH ATTACK UNSATURATED HYDROCARBONS | | | | | | | | | |
| Cuprous Acetate | Ammonia | room | 0.0089 | 0.0102 | 0.0013 | 8 | 67 | 2,950 | 2.3 |
| Do | do | hot | 0.0036 | 0.0043 | 0.0007 | 8 | 83 | 2,950 | 2.7 |
| Bromine vapor | | room | 0.1350 | 0.1775 | 0.0425 | 10 | 130 | 17,200 | 0.76 |
| Sulfur Dioxide Gas | | do | 0.0492 | 0.0502 | 0.0010 | 8 | 8 | 5,000 | 0.16 |
| t-Butylcatechol and AlCl₃ | Varsol | do | 0.1149 | 0.1140 | −0.0009 | 17 | 1 0 | 17,200 | 0.00 |
| Resorcinal and AlCl₃ | do | do | 0.0829 | 0.1720 | 0.0891 | 10 | 850 | 17,200 | 4.9 |
| Sulfuric Acid, conc | | do | 0.0099 | 0.0096 | −0.0003 | 8 | 0 | 17,100 | 0 |
| Do | | hot | 0.0055 | 0.0063 | 0.0008 | 8 | 59 | 17,100 | 0.35 |
| CLASS C—SUBSTANCES WHICH PRIMARILY DESTROY PEROXIDES | | | | | | | | | |
| Acetoxime, 2% | water | hot | 0.0090 | 0.0102 | 0.0012 | 8 | 67 | 2,950 | 2.3 |
| Butyraldoxime, 2% | do | do | 0.0285 | 0.0307 | 0.0022 | 8 | 28 | 5,000 | 0.56 |
| Furfural, 2% | do | do | 0.0199 | 0.0241 | 0.0042 | 8 | 88 | 17,100 | 0.51 |
| t-Butylcatechol | benzene | do | 0.0423 | 0.0968 | 0.0545 | 8 | 840 | 17,750 | 4.7 |
| Alpha Naphthol | do | do | 0.0762 | 0.1768 | 0.1006 | 5 | 13,700 | 17,200 | 80 |

[1] Seeds treated with solution or slurries of the agent for 1 to 4 hrs., thoroughly rinsed and dried, except as noted.
[2] This seed was later broken in two to expose the interior to butadiene vapor; it grew 1.9% in 14 days.
[3] The extremely wide fluctuation in the rate of growth of the untreated seeds may be a source of error in any comparison of these seeds.
[4] The growth expressed as weight per cent per month is obtained by extrapolating along a straight line from the actual duration of the test to a month's duration on plot of log mass of seed versus time.

We claim:

1. A process for handling olefinic hydrocarbons normally tending to form insoluble self-propagating polymers which eventually plug the handling equipment comprising handling said olefinic hydrocarbons until a small amount of said self-propagating polymer is formed, removing the olefinic hydrocarbons from the polymer, treating the said polymer at reaction conditions in the absence of said olefinic hydrocarbons with an agent capable of reacting therewith at said reaction conditions by addition to an olefinic linkage whereby further growth of said polymer is inhibited and then recontacting the olefinic hydrocarbon with the treated growth inhibited polymer.

2. A process for handling diolefins normally tending to form insoluble self-propagating polymers which eventually plug the handling equipment comprising handling said diolefins until a small amount of self-propagating polymer is formed, removing the diolefins from the polymer, treating the said polymer in the absence of diolefins with a vulcanizing accelerator capable of vulcanizing the polymer whereby further growth of said polymer is inhibited and then recontacting the diolefin with the treated polymer.

3. A process for handling butadiene normally tending to form insoluble self-propagating polymers which eventually plug the handling equipment comprising handling said butadiene until a small amount of said self-propagating polymer is formed, removing the butadiene from the polymer, treating the said polymer in the absence of said butadiene with a sulfur containing vulcanization accelerator whereby the further growth of said polymer is inhibited and then recontacting the diolefin with the treated polymer.

4. A process according to claim 3 in which the reagent capable of reacting with the polymer by addition to an olefinic linkage is tetra-methyl thiuram disulfide dissolved in benzene.

5. A process according to claim 3 in which the reagent capable of reacting with the polymer by addition to an olefinic link is sulfur dioxide.

6. A process according to claim 3 in which the reagent capable of reacting with the polymer by addition to an olefinic link is N-cyclohexyl-2-benzothiazole-sulfinamide.

CHARLES E. MORRELL.
RICHARD F. ROBEY.

REFERENCES CITED

The following references are of record in the file of this patent:

UNITED STATES PATENTS

| Number | Name | Date |
|---|---|---|
| 2,373,754 | Fryling et al. | Apr. 17, 1945 |
| 2,402,113 | Hatch et al. | June 11, 1946 |
| 2,415,009 | Hatch et al. | Jan. 28, 1947 |
| 2,425,842 | Seyfried et al. | Aug. 19, 1947 |